United States Patent
Dalrymple et al.

(10) Patent No.: US 7,975,622 B2
(45) Date of Patent: Jul. 12, 2011

(54) SYSTEM AND METHOD FOR REINFORCING RAILWAY TANK CARS

(75) Inventors: Thomas H. Dalrymple, Desoto, TX (US); Aubra D. McKisic, Flower Mound, TX (US)

(73) Assignee: Trinity Industries, Inc., Dallas, TX (US)

( * ) Notice: Subject to any disclaimer, the term of this patent is extended or adjusted under 35 U.S.C. 154(b) by 0 days.

(21) Appl. No.: 12/486,362

(22) Filed: Jun. 17, 2009

(65) Prior Publication Data

US 2010/0319571 A1    Dec. 23, 2010

(51) Int. Cl.
*B61D 5/00* (2006.01)

(52) U.S. Cl. .................... 105/358; 105/360; 105/362

(58) Field of Classification Search ............ 105/358, 105/360, 361, 362; 29/897.1, 897.2; 296/182.1, 296/186.1; 280/830, 832
See application file for complete search history.

(56) References Cited

U.S. PATENT DOCUMENTS

| | | | | |
|---|---|---|---|---|
| 2,102,124 A * | 12/1937 | Lithgow | | 220/562 |
| 2,558,648 A * | 6/1951 | Gausmann | | 105/358 |
| 3,994,239 A * | 11/1976 | Baker et al. | | 105/358 |
| 4,217,830 A * | 8/1980 | Himmelheber, Sr. | | 105/360 |
| 4,466,356 A * | 8/1984 | Messersmith et al. | | 105/358 |
| 4,527,489 A * | 7/1985 | Schlink | | 105/358 |
| 4,805,540 A * | 2/1989 | Mundloch et al. | | 105/358 |
| 4,941,410 A * | 7/1990 | Dalrymple et al. | | 105/358 |
| 5,351,625 A * | 10/1994 | Culligan et al. | | 105/362 |
| 5,465,753 A * | 11/1995 | Schwartz | | 137/587 |
| 5,467,719 A * | 11/1995 | Dalrymple et al. | | 105/362 |
| 6,357,363 B1* | 3/2002 | Miltaru | | 105/362 |
| 6,949,415 B2* | 9/2005 | Alcoe et al. | | 438/125 |
| 2002/0195019 A1* | 12/2002 | Woodall | | 105/358 |
| 2003/0141586 A1* | 7/2003 | Alcoe et al. | | 257/710 |
| 2004/0164401 A1* | 8/2004 | Alcoe et al. | | 257/704 |
| 2006/0185554 A1* | 8/2006 | Dalrymple et al. | | 105/358 |
| 2007/0125259 A1* | 6/2007 | Dalrymple | | 105/236 |
| 2008/0035015 A1* | 2/2008 | Simpson et al. | | 105/360 |
| 2008/0265094 A1* | 10/2008 | Van Der Veen et al. | | 244/123.1 |

* cited by examiner

*Primary Examiner* — S. Joseph Morano
*Assistant Examiner* — Jason C Smith
(74) *Attorney, Agent, or Firm* — Baker Botts L.L.P.

(57) ABSTRACT

An apparatus for reinforcing a railway tank car includes a tank shell. A plurality of attachment pads are welded to the tank shell to form a tank assembly. The tank assembly is subjected to a post-weld heat treatment. A plurality of shield plates may each be welded directly to at least one of the plurality of attachment pads. The shield plates are not subjected to the post-weld heat treatment.

21 Claims, 3 Drawing Sheets

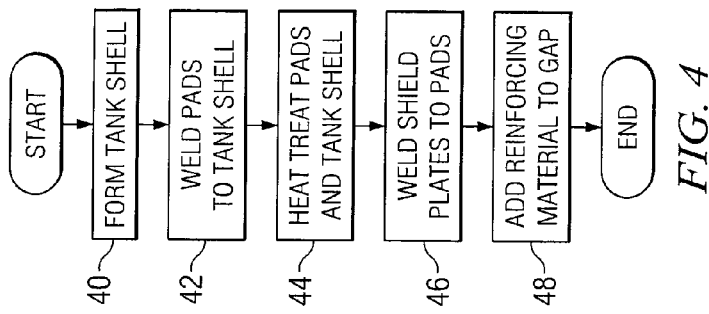
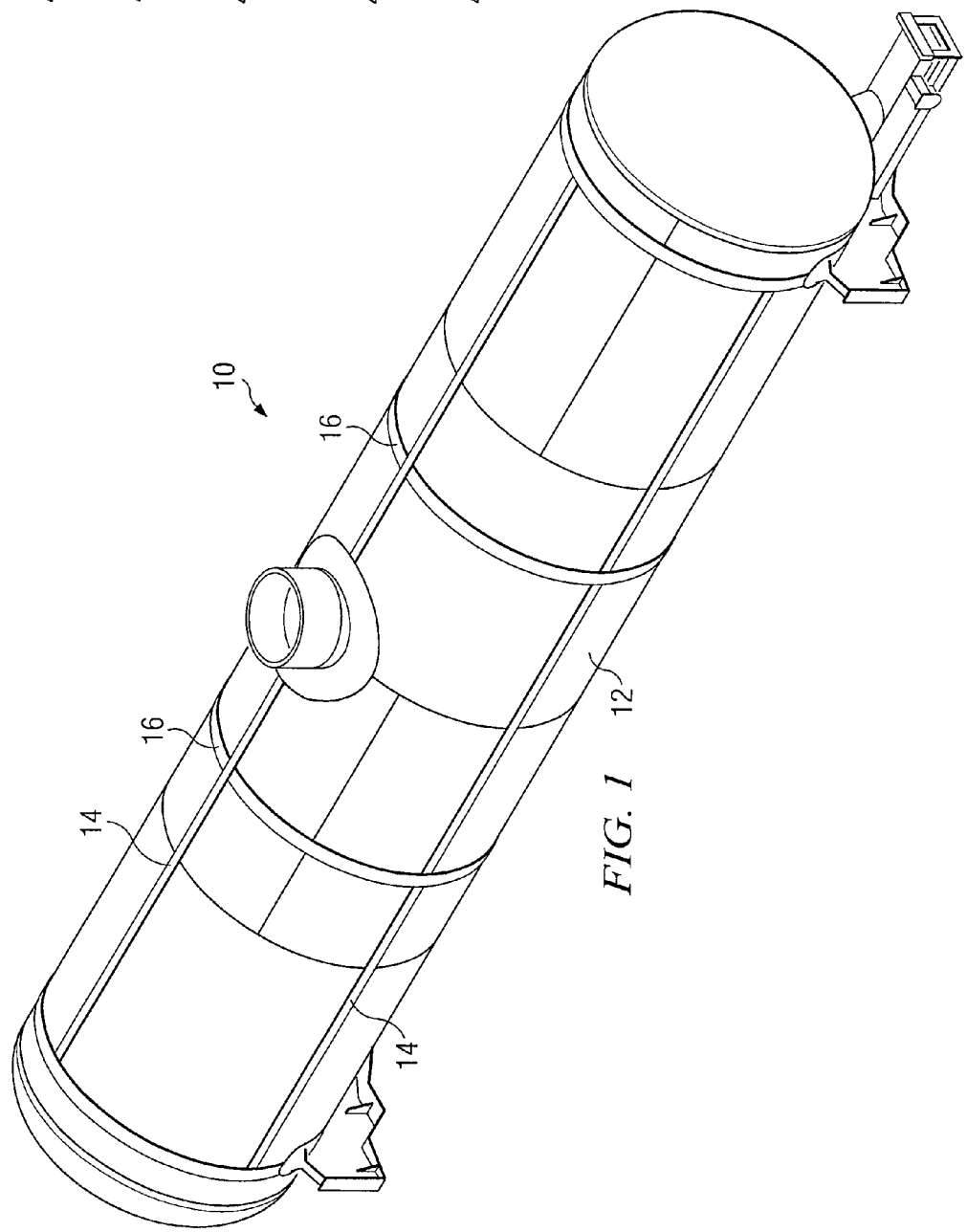

SYSTEM AND METHOD FOR REINFORCING RAILWAY TANK CARS

TECHNICAL FIELD OF THE INVENTION

The present disclosure relates generally to railcar manufacturing, and more particularly to a system and method for reinforcing railway tank cars.

BACKGROUND OF THE INVENTION

In the event of a derailment, a railway tank car may be punctured resulting in release of its contents. If the railway tank car is carrying material that is a toxic inhalation hazard (TIH), puncturing the tank car may be dangerous to nearby individuals or the environment. Applying reinforcing steel plates outside of the inner tank shell of a railway tank car may increase the puncture resistance of the car.

During manufacturing, railway tank cars undergo a post-weld heat treatment process after they are welded. This process minimizes stresses that are built up during welding and tempers any Martensite in the weld. When reinforcing steel plates are subjected to this post-weld heat treatment process, their strength properties may degrade.

SUMMARY OF THE INVENTION

The teachings of the present disclosure include an apparatus and method for reinforcing a railway tank car by applying reinforcing steel plates to a post-weld heat treated tank shell.

In accordance with an embodiment of the present disclosure, an apparatus for reinforcing a railway tank car includes a tank shell. A plurality of attachment pads are welded to the tank shell to form a tank assembly. The tank assembly is subjected to a post-weld heat treatment. A shield plate may be welded directly to at least one of the plurality of attachment pads. The shield plate is not subjected to the post-weld heat treatment.

In accordance with a further embodiment of the present disclosure, a method for reinforcing a railway tank car includes forming a tank shell. A plurality of attachment pads are welded to the tank shell to form a tank assembly. Then, the tank assembly is subjected to a post-weld heat treatment. A shield plate is welded directly to at least one of the plurality of attachment pads after the post-weld heat treatment.

Technical advantages of particular embodiments of the present disclosure include the ability to reinforce a railway tank car by welding steel sheets along the length of the railway tank car. The steel sheets may maintain their mechanical properties because they are not subjected to a post-weld heat treatment process.

Further technical advantages of particular embodiments of the present disclosure include creating a gap between a shield sheet and a tank shell of a railway tank car. This gap may be filled with reinforcing material to increase the crashworthiness and puncture resistance of the completed railway tank car.

Other technical advantages will be readily apparent to one of ordinary skill in the art from the following figures, descriptions, and claims. Moreover, while specific advantages have been enumerated above, various embodiments may include all, some, or none of the enumerated advantages.

BRIEF DESCRIPTION OF THE DRAWINGS

A more complete understanding of embodiments of the disclosure will be apparent from the detailed description taken in conjunction with the accompanying drawings in which:

FIG. 1 illustrates an isometric view of a tank assembly including attachment pads in accordance with an embodiment of the present disclosure;

FIG. 4 illustrates a flow diagram of a method of reinforcing a railway tank car in accordance with an embodiment of the present disclosure.

DETAILED DESCRIPTION OF THE INVENTION

Figure 2B:
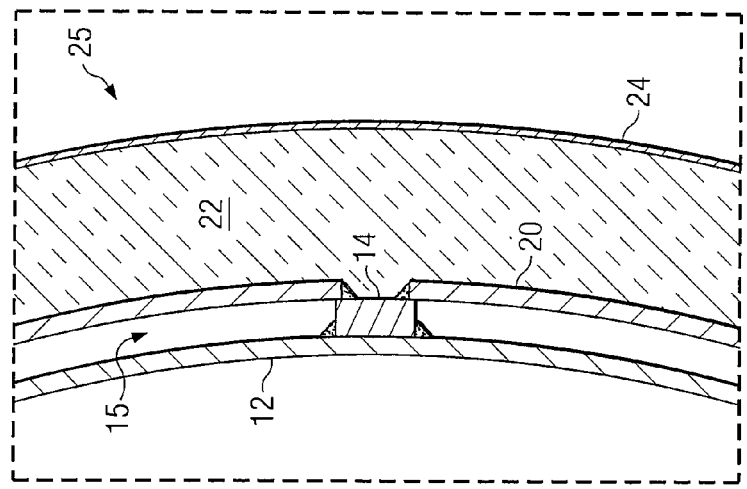
FIG. 2B illustrates a magnified view of a section of the jacketed tank assembly illustrated in FIG. 2A.

Example embodiments of the disclosure and their advantages are best understood by referring to FIGS. 1-4 of the drawings.

FIG. 1 illustrates a tank assembly in accordance with an embodiment of the present disclosure. Tank assembly 10 is illustrated in an uncompleted stage of manufacturing and assembly. Tank assembly 10 includes tank shell 12. Tank shell 12 may contain the payload of the completed railway tank car. This payload may include toxic inhalation hazards (TIH). For example, a TIH carried by the tank car may be chlorine, anhydrous ammonium, bromine, or other hazardous materials.

Due to the toxic nature of the payload, the puncture resistance of railway tank cars that carry toxic materials may be important to ensure the protection of the environment and individuals in the event of a derailment.

A TIH such as chlorine may be a commodity that is hauled in a tank car rated at a test pressure of 500 lbs. per square inch (psi). In certain situations, it may be desirable to "over package" the commodity by using a tank car with a pressure rating of 600 psi. Although a 500 psi tank car is structurally capable of containing the commodity, the 600 psi tank car may have increased puncture resistance due to an increased shell thickness. However, in order to further increase the crashworthiness and puncture resistance of the tank car, it may be desirable to reinforce the shell.

A conventional method of increasing the puncture resistance of a tank car may involve welding steel plates directly to tank shell 12. For example, steel plates made of A516-70 steel may reinforce tank shell 12 with an ASTM grade steel that has 70,000 psi ultimate tensile strength. Another option may be to weld a proprietary grade steel to the shell of the tank car. The proprietary grade steel may have an ultimate tensile strength of 81,000 psi. In other applications, T-1 or HPS-100 steel may be used to reinforce tank shell 12.

Welding steel reinforcing plates directly to tank shell 12 may not increase the crashworthiness of a tank car to the maximum amount possible because the properties of the reinforcing steel plates may degrade when the tank car assembly is subjected to post-weld heat treatment. After any welding operation performed on tank shell 12, tank assembly 10 must undergo a post-weld heat treatment process. This post-weld heat treatment process includes placing the tank assembly in a furnace and heating it for a certain period of time. This is done to reduce the stresses that build up during welding and also tempers the Martensite in the welds. This post-weld heat treatment process may also degrade the properties of steel. Therefore, it would be desirable to add the reinforcing steel plates to the tank car assembly without having to subject the reinforcing steel plates to a post-weld heat treatment process.

In order to avoid heat treating the reinforcing steel plates, steel reinforcing plates may be welded to longitudinal and/or circumferential attachment pads 14 and 16, as opposed to welding the plates directly to tank shell 12. Tank shell 12 may be formed and then longitudinal attachment pads 14 may be attached at certain locations around the circumference of tank shell 12. In a particular embodiment, four longitudinal attachment pads 14 may be placed at 90 degree intervals around the circumference of tank shell 12. Other locations of longitudinal attachment pads 14 may be used in accordance with embodiments of the present disclosure. Also, there may be more or less than four longitudinal attachment pads 14 attached to tank shell 12. For example, an embodiment may include eight longitudinal attachment pads 14 located at 45 degree intervals around the circumference of tank shell 12. Circumferential attachment pads 16 may also be welded to wrap around the circumference of tank shell 12 at certain intervals along the length of tank shell 12.

After longitudinal and/or circumferential attachment pads 14 and 16 are attached with fillet welds directly to tank shell 12, then the assembly including tank shell 12 and attachment pads 14 and 16 may be subjected to the post-weld heat treatment process. After post-weld heat treatment, reinforcing shield plates 20, shown in FIGS. 2A-3, may be welded directly to longitudinal and/or circumferential attachment pads 14 and 16. Certain embodiments of the present invention may include longitudinal attachment pads 14 and not circumferential attachment pads 16. Other embodiments may include circumferential attachment pads 16 and not longitudinal attachment pads 14. Still other embodiments may include both longitudinal and circumferential attachment pads 14 and 16.

Because shield plates 20 are welded directly to attachment pads 14 and/or 16, as opposed to tank shell 12, no additional post-weld heat treatment process is required. Therefore, shield plates 20 may maintain their original strength properties and will not be degraded by a post-weld heat treatment process.

Figure 2A:
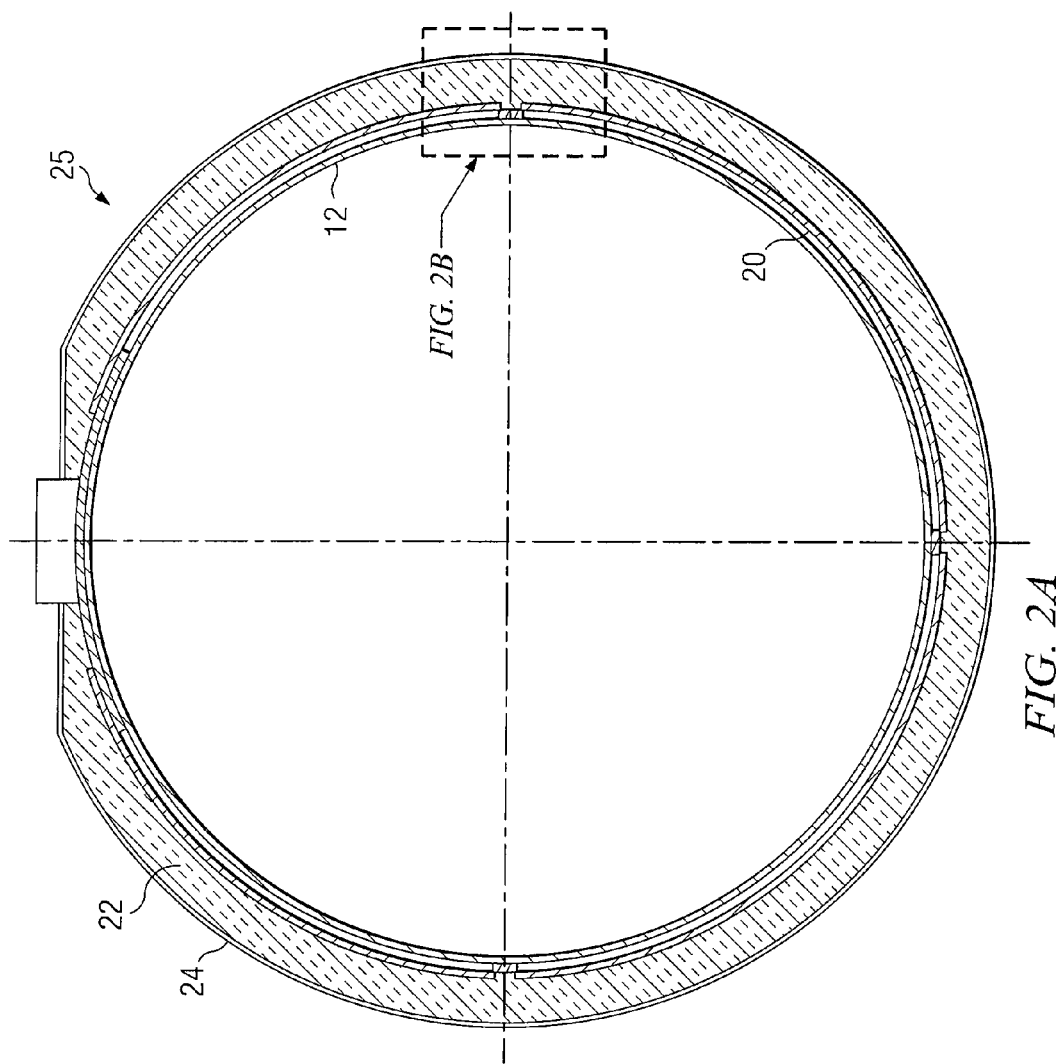
FIG. 2A illustrates a cross-sectional view of a portion of a jacketed tank assembly in accordance with a particular embodiment of the present disclosure.

FIG. 2A illustrates a jacketed tank assembly 25. FIG. 2B illustrates a magnified section of jacketed tank assembly 25 shown in FIG. 2A. As shown in FIG. 2B, longitudinal attachment pads 14 may be welded directly to tank shell 12 using fillet welds. Longitudinal attachment pads 14 may be a 1 inch by 4 inch steel bar. In some embodiments, it may be a ½ inch by 4 inch steel bar. Any suitable size bar may be used in accordance with embodiments of the present disclosure. This assembly of tank shell 12 and longitudinal attachment pads 14 may then be heat treated. After post-weld heat treatment, shield plates 20 may be welded directly to longitudinal attachment pads 14 using fillet welds. Because shield plates 20 are welded to longitudinal attachment pads 14, and not to tank shell 12, no post-weld heat treatment process is required after welding shield plates 20 to longitudinal attachment pads 14.

As shown in FIG. 2B, gap 15 may be created between shield plates 20 and tank shell 12. Gap 15 may be filled with reinforcing material to increase the puncture resistance of the completed tank car. For example, gap 15 may be filled with polyurethane or other suitable reinforcing material.

Outer jacket 24 may be attached to the assembly in a conventional manner. Between outer jacket 24 and shield plates 20 may be thermal protection 22. Thermal protection 22 may be designed to have high temperature resistance without breaking down and losing its thermal properties. For example, thermal protection 22 may be two inches of thermal insulation underneath two inches of fiberglass insulation. Outer jacket 24 may be a mild sheet steel, such as a A-111 steel.

Figure 3:
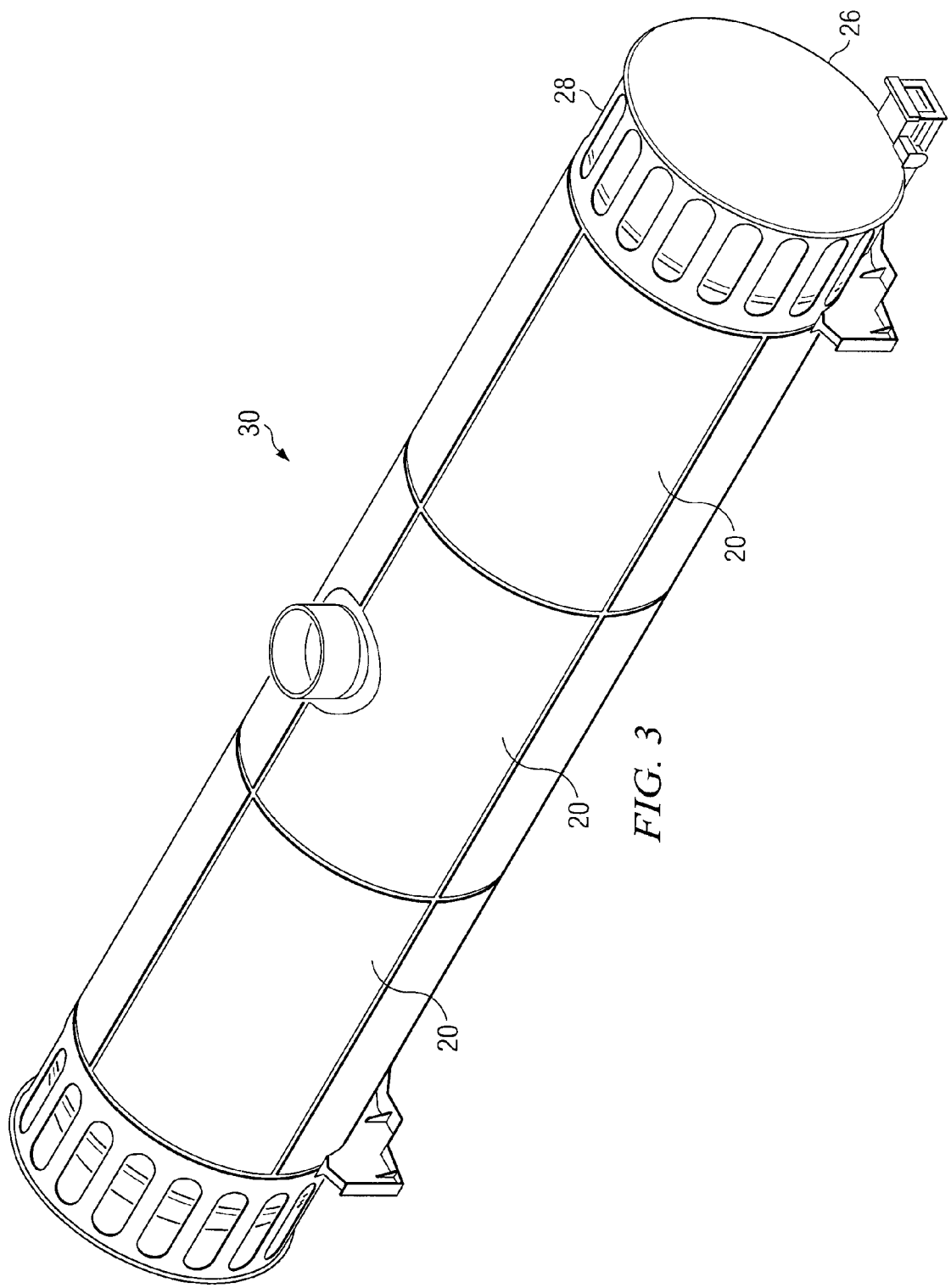
FIG. 3 illustrates an isometric view of a reinforced tank assembly in accordance with a particular embodiment of the present disclosure.

FIG. 3 illustrates shielded tank assembly 30. Shielded tank car assembly 30 is shown with outer jacket 24 and thermal protection 22 removed to reveal shield plates 20. The completed shielded tank may be coupled to a railway car base to form a shielded railway tank car configured to haul hazardous material.

As previously described, shield plates 20 may be welded directly to longitudinal and/or circumferential attachment pads 14 and 16, as opposed to tank shell 12. At one end of shielded tank assembly 30 is head shield 26. Head shield 26 is separated from the body of shielded tank assembly 30 by head shield support 28. Head shield support 28 provides a crush zone in the event of head shield 26 sustains an impact. Shielded tank assembly 30 may have thermal protection 22 and outer jacket 24 added to it.

FIG. 4 illustrates a flow diagram of a method to reinforce a railway tank car. The method begins at step 40 where a tank shell of a railway tank car is formed. At step 42, longitudinal attachment pads 14 may be fillet welded at certain intervals around the circumference of the tank shell. Also at step 42, circumferential attachment pads may be fillet welded at certain intervals along the length of the tank shell.

At step 44, the tank shell and the attachment pads may be subjected to post-weld heat treatment. That is, the tank shell and the attachment pad assembly may be placed in a furnace and heated to minimize the stresses that built up during welding and to temper the Martensite in the weld. At step 46, reinforcing shield plates are welded to the attachment pads. Because the shield plates are welded to the attachment pads and not the tank shell, no subsequent post-weld heat treatment process is required. Thus, the full strength of the steel shielding plates may be realized because the steel plates do not undergo a post-weld heat treatment process that might otherwise reduce its strength properties. At step 48, reinforcing material is added to the gap between the shield plates and the tank shell, and the method ends.

Although the present disclosure has been described in detail with reference to particular embodiments, it should be understood that various other changes, substitutions, and alterations may be made hereto without departing from the spirit and scope of the present disclosure. For example, other materials and sizes may be used for the attachment pads. Also, other material may be used for reinforcing material and shield plates.

Numerous other changes, substitutions, variations, alterations, and modifications may be ascertained by those skilled in the art and it is intended that the present disclosure encompass all such changes, substitutions, variations, alterations, and modifications as falling within the spirit and scope of the appended claims.

What is claimed is:

1. An apparatus for reinforcing a tank of a railway tank car, comprising:
 a tank shell;
 a plurality of circumferential attachment pads, each of the circumferential attachment pads welded to and wrapped around a respective lateral circumference of the tank shell to form a tank assembly, the tank assembly being subjected to a post-weld heat treatment; and
 a plurality of shield plates, each of the plurality of shield plates welded directly to at least one of the plurality of circumferential attachment pads, the shield plate not being subjected to the post-weld heat treatment.

2. The apparatus of claim 1, further comprising a plurality of longitudinal attachment pads welded to the tank shell in a longitudinal orientation.

3. The apparatus of claim 2, wherein the plurality of longitudinal attachment pads are welded at 90 degree intervals around a circumference of the tank shell.

4. The apparatus of claim 2, wherein the plurality of longitudinal attachment pads are welded at 45 degree intervals around a circumference of the tank shell.

5. The apparatus of claim 1, wherein each of the plurality of circumferential attachment pads are heat treated, and each of the plurality of shield plates are welded to a heat-treated circumferential attachment pad.

6. The apparatus of claim 1, wherein at least one of the plurality of shield plates is welded to a longitudinal attachment pad and a circumferential attachment pad.

7. The apparatus of claim 1, wherein each of the plurality of shield plates is welded directly to at least one of the plurality of circumferential attachment pads such that a gap is formed between each respective shield plate and the tank shell.

8. The apparatus of claim 7, further comprising a reinforcing material disposed within each respective gap formed by the plurality of shield plates and the tank shell.

9. The apparatus of claim 1, further comprising an outer jacket at least partially enclosing the plurality of shield plates.

10. The apparatus of claim 9, further comprising a thermal protection material, wherein the thermal protection material is disposed between the outer jacket and the plurality of shield plates.

11. The apparatus of claim 1, further comprising:
a head shield support attached to an end of the tank shell; and
a head shield attached to the head shield support.

12. A method for reinforcing a railway tank car, comprising:
forming a tank shell;
welding each of a plurality of circumferential attachment pads to at least a portion of a respective lateral circumference of the tank shell to form a tank assembly, each of the plurality of circumferential attachment pads wrapping around each respective lateral circumference of the tank shell;
subjecting the tank assembly to a post-weld heat treatment;
welding each of a plurality of shield plates directly to at least one of the plurality of circumferential attachment pads after the post-weld heat treatment.

13. The method of claim 12, further comprising welding a plurality of longitudinal attachment pads to the tank shell in a longitudinal orientation.

14. The method of claim 13, wherein welding the plurality of longitudinal attachment pads to the tank shell comprises welding the plurality of longitudinal attachment pads at 90 degree intervals around the tank shell.

15. The method of claim 13, wherein welding the plurality of longitudinal attachment pads to the tank shell comprises welding the plurality of longitudinal attachment pads at 45 degree intervals around the tank shell.

16. The method of claim 13, further comprising welding at least one of the plurality of shield plates to a longitudinal attachment pad and a circumferential attachment pad.

17. The method of claim 12, wherein welding each of the plurality of shield plates comprises welding each of the plurality of shield plates directly to at least one of the circumferential attachment pads after the post-weld heat treatment such that a gap is formed between each respective shield plate and the tank shell.

18. The method of claim 17, further comprising disposing a reinforcing material within each respective gap formed by the plurality of shield plates and the tank shell.

19. The method of claim 12, further comprising at least partially enclosing the plurality of shield plates using an outer jacket.

20. The method of claim 19, further comprising disposing a thermal protection material between the outer jacket and the plurality of shield plates.

21. The method of claim 12, further comprising:
attaching a head shield support to an end of the tank shell; and
attaching a head shield to the head shield support.

* * * * *